(12) United States Patent
Caimi

(10) Patent No.: US 10,094,403 B2
(45) Date of Patent: Oct. 9, 2018

(54) DEVICE FOR HANGING A SOUND-ABSORBING PANEL OR THE LIKE

(71) Applicant: ELEDA S.r.l., Milan (IT)

(72) Inventor: Renato Caimi, Milan (IT)

(73) Assignee: Caimi Brevetti S.p.A., Nova Milanese (MB) (IT)

( * ) Notice: Subject to any disclaimer, the term of this patent is extended or adjusted under 35 U.S.C. 154(b) by 0 days.

(21) Appl. No.: 15/124,381

(22) PCT Filed: Mar. 9, 2015

(86) PCT No.: PCT/IB2015/051698
§ 371 (c)(1),
(2) Date: Sep. 8, 2016

(87) PCT Pub. No.: WO2015/136428
PCT Pub. Date: Sep. 17, 2015

(65) Prior Publication Data
US 2017/0074301 A1    Mar. 16, 2017

(30) Foreign Application Priority Data

Mar. 11, 2014  (IT) .............................. MI20140092 U

(51) Int. Cl.
*F16B 5/00* (2006.01)
*F16B 5/02* (2006.01)
(Continued)

(52) U.S. Cl.
CPC .................. *F16B 5/02* (2013.01); *B32B 3/08* (2013.01); *B32B 3/263* (2013.01); *B32B 5/02* (2013.01);
(Continued)

(58) Field of Classification Search
CPC ....... E05D 5/02; E05D 5/06; E05Y 2900/142; G10K 11/168; B32B 3/08; B32B 3/263; B32B 5/02; B32B 5/18; B32B 5/245; B32B 7/12; B32B 2255/02; B32B 2262/0276; B32B 2607/00; E04B 2001/8461; E04B 2/7403; E04B 1/86; E04B 9/225; E04B 9/366
(Continued)

(56) References Cited

U.S. PATENT DOCUMENTS 6,854,202 B1 * 2/2005 Ives .................... G09F 15/0087
40/491
2012/0285103 A1   11/2012 Canavarro

FOREIGN PATENT DOCUMENTS

| BE | 890583 | 2/1982 |
| DE | 202006006030 | 2/2007 |
| WO | 2013113800 | 8/2013 |

* cited by examiner

*Primary Examiner* — Charles A Fox
*Assistant Examiner* — James Buckle, Jr.
(74) *Attorney, Agent, or Firm* — Patti & Malvone Law Group, LLC

(57) ABSTRACT

A device which can be fixed to the edge of a panel, for example a sound-absorbing panel formed by heat-bonded synthetic fibers, is disclosed. The device includes a body with a longitudinal through-hole and two walls which define a cavity for enclosing the edge of the panel. The through-hole communicates with the cavity. The through-hole is configured to guide a threaded element (screw or the like) towards the cavity so that the threaded element engages at least with the edge of the panel so that it expands towards the walls of the cavity and is firmly retained by them.

17 Claims, 10 Drawing Sheets

(51) Int. Cl.
    *E04B 1/86*      (2006.01)
    *E04B 2/74*      (2006.01)
    *E05D 5/02*      (2006.01)
    *E05D 5/06*      (2006.01)
    *B32B 3/08*      (2006.01)
    *B32B 3/26*      (2006.01)
    *B32B 5/02*      (2006.01)
    *B32B 5/18*      (2006.01)
    *B32B 5/24*      (2006.01)
    *B32B 7/12*      (2006.01)
    *E04B 9/22*      (2006.01)
    *E04B 9/36*      (2006.01)
    *E04B 1/84*      (2006.01)
    *G10K 11/168*    (2006.01)

(52) U.S. Cl.
    CPC ............... *B32B 5/18* (2013.01); *B32B 5/245* (2013.01); *B32B 7/12* (2013.01); *E04B 1/86* (2013.01); *E04B 2/7403* (2013.01); *E05D 5/02* (2013.01); *E05D 5/06* (2013.01); *B32B 2255/02* (2013.01); *B32B 2262/0276* (2013.01); *B32B 2307/102* (2013.01); *B32B 2307/3065* (2013.01); *B32B 2607/00* (2013.01); *E04B 9/225* (2013.01); *E04B 9/366* (2013.01); *E04B 2001/8461* (2013.01); *E05Y 2900/142* (2013.01); *G10K 11/168* (2013.01)

(58) Field of Classification Search
    USPC .......................................................... 52/144
    See application file for complete search history.

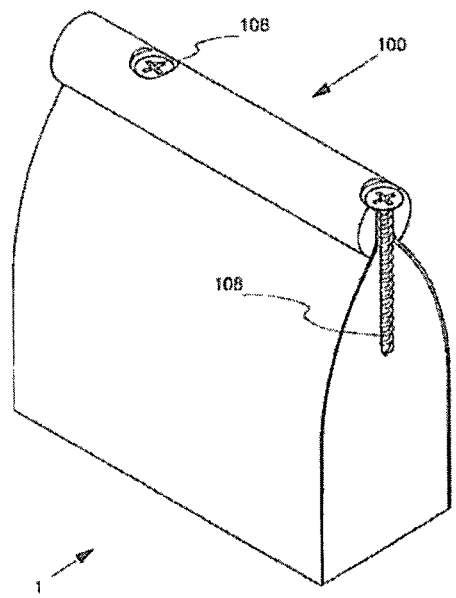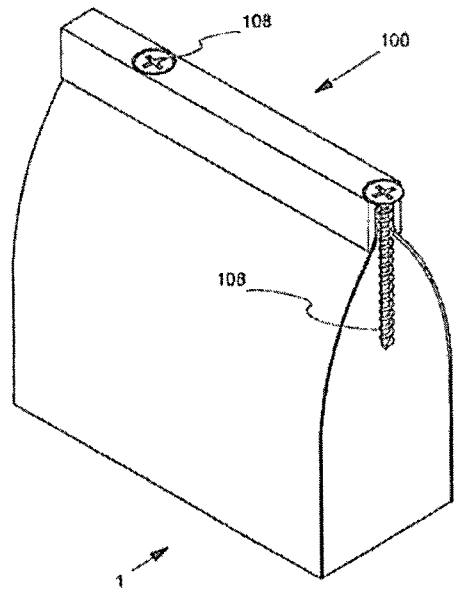
Fig.9a　　　　　　　　　　　　Fig.9b
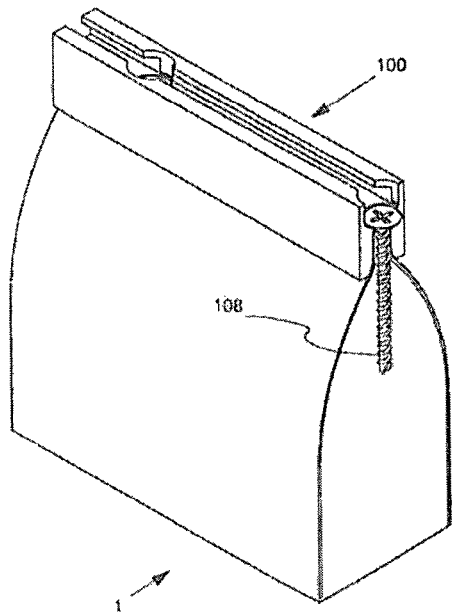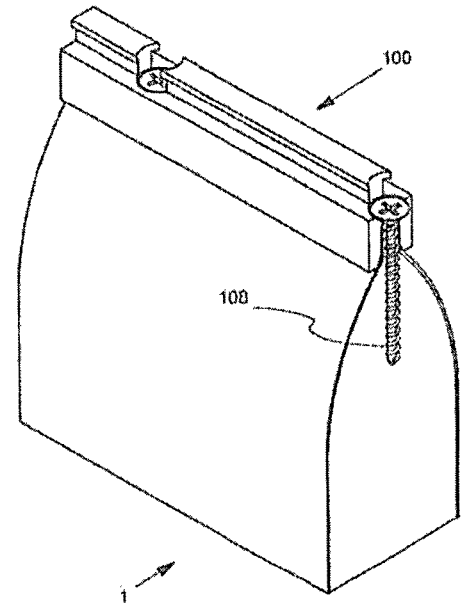
Fig.9c　　　　　　　　　　　　Fig.9d

DEVICE FOR HANGING A SOUND-ABSORBING PANEL OR THE LIKE

FIELD OF THE INVENTION

The present invention relates to a device for hanging and/or supporting a sound-absorbing panel or other similar object.

BACKGROUND OF THE INVENTION

It is known that, when a sound wave emitted in a closed room encounters a surface, part of its energy passes through the surface, part is absorbed by the impact with the surface and part is reflected into the room.

If, in a room, the reflective surface area is high, the room may be acoustically very disturbed since the sound waves produced inside it are amplified with an effect similar to that of an echo.

In order to improve the acoustics of a room, without structural modifications, it is known to provide in the room one or more sound-absorbing panels for absorbing a large amount of the energy.

The acoustic correction measures involve lining the internal surfaces of the rooms with sound-absorbing materials; they must have suitable characteristics not only acoustically, but also aesthetically speaking, since they are required to blend in with the interior design and furnishings.

Sound-absorbing materials have the property that they absorb at least a part of the acoustic energy and reduce the amount of reflected energy.

The known sound-absorbing materials, to be applied for example to a wall, have a structure composed of a layer of foam material (for example foam rubber) lined with a sheet and kept rigid by a perimetral frame made of metal (for example aluminium), plastic or wood. The sheet is typically wrapped around the perimetral frame so as not to show, at least on one visible side, stitching or other joints. However, when a sound-absorbing panel must have two visible sides, it is more difficult to mask a joint in the sheet, in a zone where one edge of the sheet overlaps the other edge of the sheet.

In other known panels, the padding layer is combined with a rigid surface (for example made of metal, plastic or wood) which increases the rigidity thereof. The rigid surface may be positioned on one side of the padding or inside the padding itself, creating a sandwich structure.

A first drawback of the sound-absorbing panels made according to the prior art consists in the presence of the frame or support surface. Said panels may in fact have a considerable weight and therefore be difficult to handle, install and support; moreover often the frame or the support surface constitute the most costly item of the panel.

Another drawback, as already mentioned, is that the sound-absorbing panels must have not only good sound-absorbing properties, but also satisfactory aesthetic characteristics since they must blend in with the interior design and the furnishings. The frame and the joints between two sheet edges used to cover the panel undoubtedly constitute unattractive features which do not blend in with the surroundings.

The problem which arises is that of providing a system for supporting a sound-absorbing panel in relation to the ceiling, a wall or any other support. The problem which also arises is that of providing a system for connecting together two or more sound-absorbing panels in a rigid or rotatable manner.

The technical problem is therefore that of providing a device which can be fixed to a sound-absorbing panel (or other similar object) and which allows said panel to be hung or in any case to be supported in relation to a ceiling, a wall and/or another panel.

SUMMARY OF THE INVENTION

According to the Applicant, the problem may be solved by means of a device which can be fixed to the edge of a panel (for example a sound-absorbing panel), said device comprising a main body with a longitudinal through-hole and two walls which define a cavity for enclosing the edge of the panel, wherein said through-hole communicates with said cavity, wherein said through-hole is configured to guide a threaded element towards said cavity so that said threaded element engages with at least said edge of the panel so that it expands towards the wall of the cavity and is firmly retained by them.

The threaded element may be a screw, for example a self-tapping screw.

Advantageously, the end section of the through-hole has a diameter smaller than the distance between the two walls of the cavity.

The through-hole may have a threaded section for engaging with another corresponding member.

According to another embodiment, the main body comprises a threaded external surface for engaging with another corresponding member.

According to another embodiment, the main body comprises a pair of small coaxial holes for another corresponding member.

The aforementioned corresponding member may be a threaded member, for example a bar with a thread on its internal or external surface.

The body may be made of a metallic material, for example steel, stainless steel, brass, aluminium or aluminium alloy and the cavity may be obtained by means of milling or casting. The body may also be made of a plastic material or wood.

The main body may be substantially cylindrical (or square, triangular, oval, spherical, etc.), having an axis substantially coinciding with the axis of the through-hole. Alternatively, it may be an elongated bar extending in a direction substantially perpendicular to the axis of the through-hole.

The elongated bar may have a substantially circular or square cross-section or may form a guide rail.

The device may be rotatably coupled together with another similar device in order to form a hinge.

According to another aspect, the invention relates to an assembly comprising a device as set forth above and a panel, for example a sound-absorbing panel.

The invention will emerge more clearly by reading the detailed description below provided by way of a non-limiting example, to be read with reference to the accompanying drawings.

BRIEF DESCRIPTION OF THE DRAWINGS

FIGS. 9a-9d show three respective further embodiments of a device according to the invention.

DETAILED DESCRIPTION OF THE INVENTION

Figure 1:
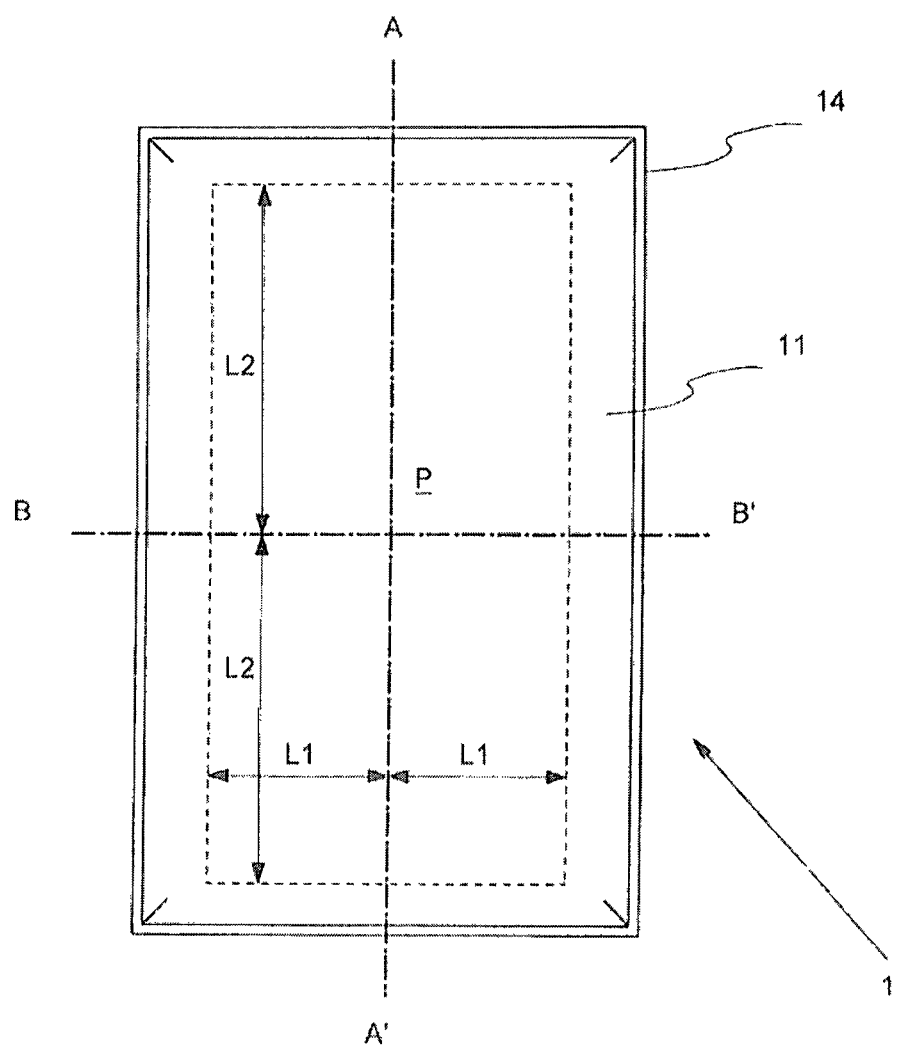
FIG. 1 is a schematic front view of a sound-absorbing panel suitable for use with the present invention.
Figure 2:
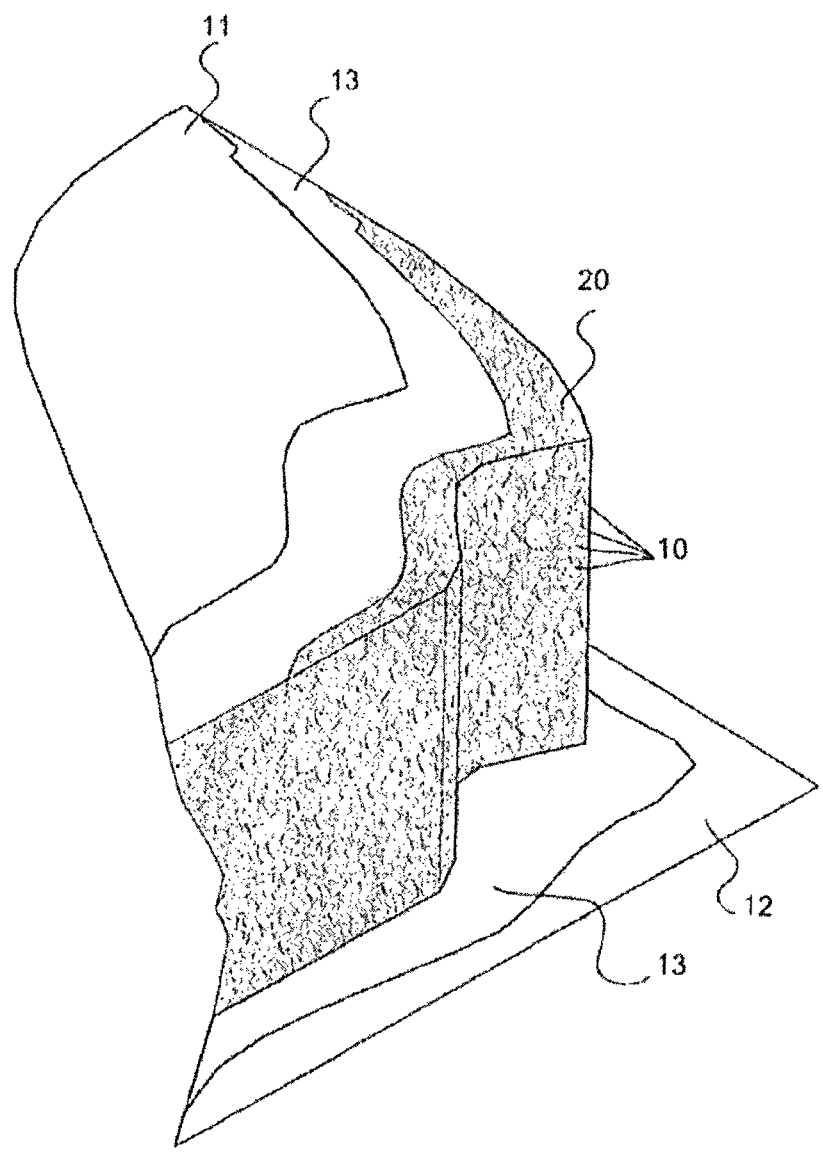
FIG. 2 shows the various layers of the panel according to FIG. 1.
Figure 3:
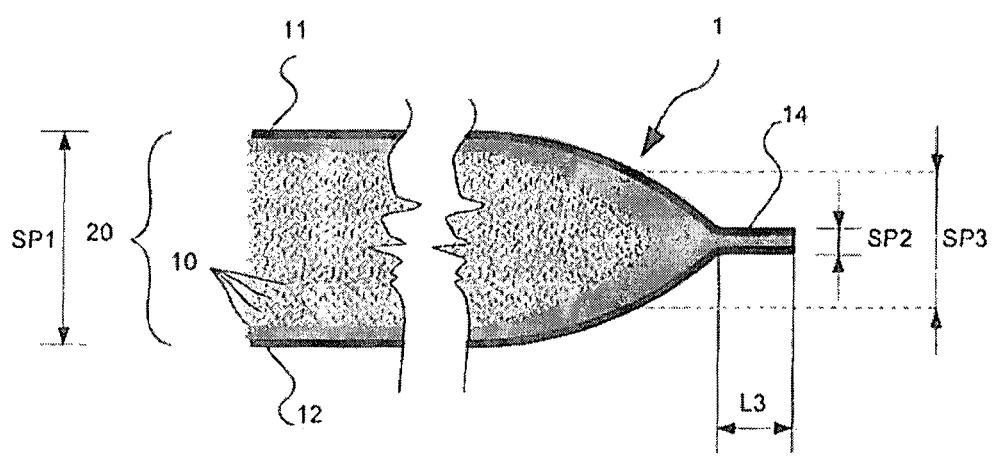
FIG. 3 is a schematic cross-sectional view of a part of the panel according to FIG. 1.

With reference to FIGS. 1, 2 and 3, these show a sound-absorbing panel 1 comprising a padding layer 20 which is preferably shaped. Said panel preferably comprises heat-bonded synthetic fibres 10, a first and second layer of fabric facing each other on opposite sides of the padding layer 20. The padding layer 20 is shaped so as to have an edge 14 with a smaller thickness than the thickness of the padding layer in a central position of the panel 1. The edge has an edge width indicated by L3 in FIG. 3.

The panel may have a rectangular shape (as in FIG. 1) or any other shape such as a square, irregular quadrilateral, trapezoidal, circular, oval, elliptical, triangular or other shape.

In one embodiment, the heat-bonded synthetic fibres 10 comprise polyester fibres.

Preferably, the fibres are non-toxic and non-irritants. Furthermore they may be fully recycled.

The sound-absorbing panel 1 preferably comprises a first fabric layer 11 facing a first side of the padding layer 20. The sound-absorbing panel 1 also comprises, preferably, a second fabric layer 12 facing a second opposite side of the padding layer 20 (FIG. 3).

Preferably, the fabric layers 11, 12 are also made of polyester.

In one embodiment, the fabric is of the Trevira CS flame-retarding type.

The panel 1 may comprise preferably an adhesive layer 13 arranged between the padding layer 20 and each of the fabric layers 11 and 12.

In particular, the adhesive layer 13 may advantageously comprise a layer of glue, preferably applied by means of spreading.

The panel 1, in a central position P thereof (FIG. 1), has a first thickness SP1 (FIG. 3) preferably of between about 2 cm and about 7 cm. In one embodiment, the first thickness SP1 is about 3.7 cm.

For the purposes of the present description and the accompanying claims, the term "central position P" is understood as meaning a position inside a central area of the panel. In turn, the term "central area" is understood as meaning an area which is sufficiently distant from the perimeter of the panel and from the transition contour. For example, for a rectangular shaped panel with a first axis parallel to the long side and a second axis parallel to the short side, the central area is a substantially rectangular area symmetrical relative to the first and second axes. The central area may have a width equal to 2×L1, where L1 is about 30% of the width of the panel, and a length equal to 2×L2, where L2 is about 30-40% of the height of the panel. FIG. 1 shows in the form of a broken line, by way of example, a central area for the panel 1. In the case of a square shaped panel, the central area may have a square area centred on the centre of the panel having a side with a length equal to about 50% of the side of the panel. In the case of a circular shaped panel, the central area may be a central area centred on the centre of the panel and having a diameter equal to about 50% of the panel diameter. In the central area there may be depressions used for fastening purposes, but these local depressions with a small thickness must not be considered for the purposes of an evaluation of the thickness of the panel in the central area.

Advantageously, the panel 1 may be shaped so as to have an edge 14 with a second thickness SP2, smaller than the first thickness SP1 (FIG. 3). The edge 14 has a width L3 which may be for example equal to about 0.5-2 cm.

The second thickness SP2 in the region of the edge 14 may be between 5% and about 30% of the first thickness SP1.

The edge 14 may be formed along at least part of the perimeter of the panel 1 or, alternatively, along the entire perimeter of the panel 1.

The panel 1 may have a transition thickness SP3 (FIG. 3) which is variable depending on the distance between the edge 14 and the central position P.

In particular, the transition thickness SP3 increases from the value of the second thickness SP2 to the value of the first thickness SP1 with a substantially logarithmic progression as the distance from the edge 14 increases.

The panel 1 has density values which vary from the central position P as far as the edge 14.

Moreover, preferably, the padding layer 20, in at least one portion of the panel (for example the central area P), has a variable density, which is greater in the region of its external layer and smaller in the region of its inner layer.

Advantageously, according to the invention, the structure created does not require any support frame; in fact the edge 14 acts as a frame.

Moreover, the panel does not require any joint between sheet edges, since no covering sheet is envisaged; the covering, in fact, in one embodiment, consists of the fabric layers 11 and 12 which form a single body with the padding layer 20. The aesthetic characteristics, therefore, are particularly attractive and may be blended in (also in terms of colours or shapes) with the characteristics of the surroundings.

The low weight of the panel 1 facilitates the design of all the support means necessary for hanging or joining the panel.

Preferably, the padding layer 20 and the fabric layers 11, 12 are made of fireproof material.

Preferably, the padding layer 20 and the fabric layers 11, 12 are treated with antibacterial material.

In short, the panel achieves several advantages: it does not require any support frame because the edge acts as a frame; it does not require any joint between sheet edges since (at least in one embodiment) no covering sheet is envisaged; the covering, in fact, consists of the fabric layers which forms a single body with the padding layer, and the aesthetic characteristics are particularly attractive and may be blended in with the characteristics of the surroundings.

The edge also acts, at least partly, as a sound-absorbing material and prevents the reflection of sound waves.

The panel may be easily hung from a wall or the ceiling or joined to a base element since it has a much smaller weight compared to the panels of the prior art.

The low weight of the panel facilitates the design of all the support means necessary for hanging or joining the panel.

It is fully recyclable since it is made entirely of polyester.

FIGS. 4, 5 and 6 show three different embodiments of the device 100 according to the invention.

With reference initially to FIG. 4, the device 100 according to the first embodiment of the invention comprises a cylindrical main body 101 with a through-hole 102 between a first top end and a second bottom end. The through-hole 102 is visible in the longitudinal section shown in FIG. 4*f* and FIG. 4*d*. The main body could, however, have a square, rectangular, oval or other cross-section.

Any orientational reference given in this description and/or in the claims is provided solely for greater clarity, and refers to the orientation adopted in the figures, but does not form any limitation of the scope of protection of the invention. During use, the orientation of the invention may be different from that of the Figures (for example horizontal, inclined or upside down).

Figure 4A:
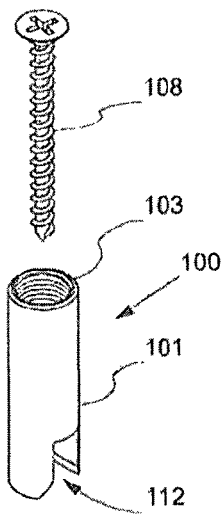
FIGS. 4a-4h are various views of the device according to a first embodiment of the invention.
Figure 4B:
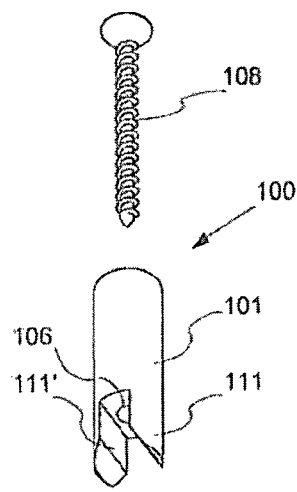
Figure 4C:
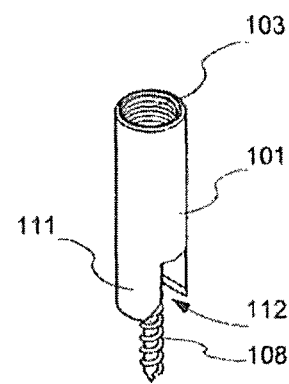
Figure 4D:
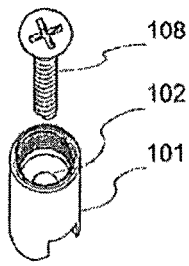
Figure 4E:
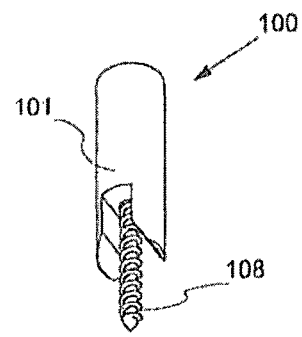
Figure 4F:
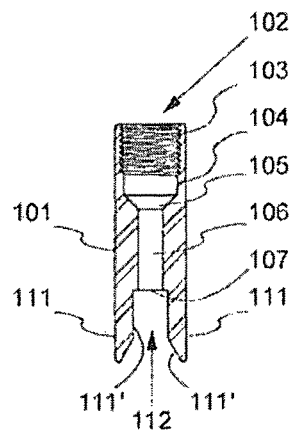
Figure 4G:
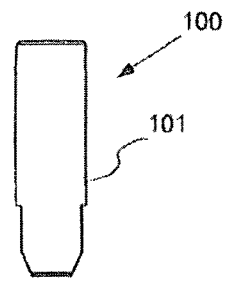
Figure 4H:
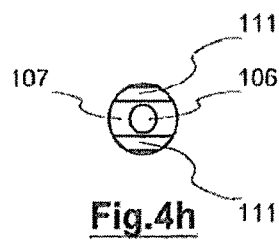
Figure 5A:
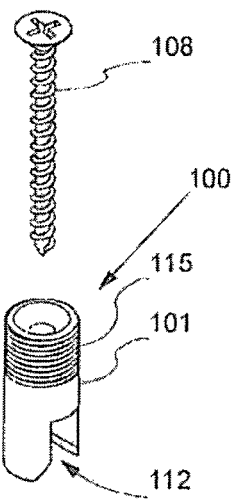
FIGS. 5a-5h are various views of the device according to a second embodiment of the invention.
Figure 5B:
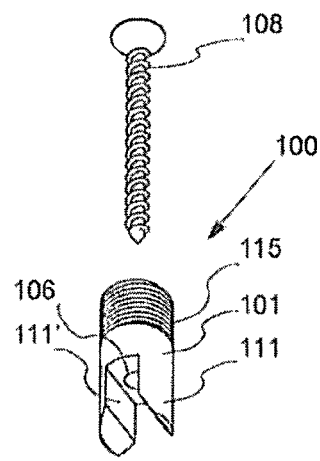
Figure 5C:
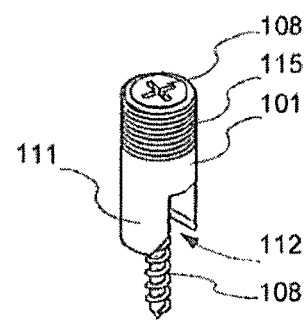
Figure 5D:
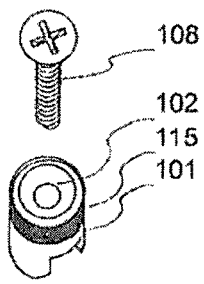
Figure 5E:
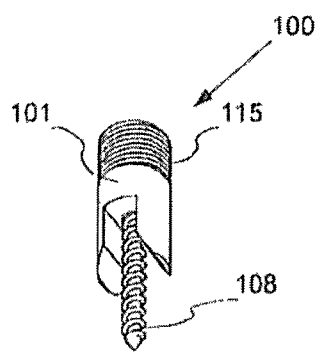
Figure 5F:
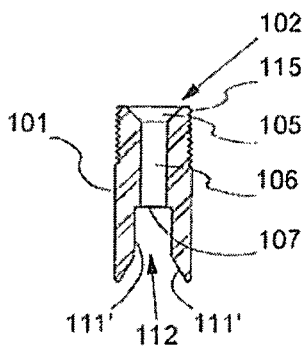
Figure 5G:
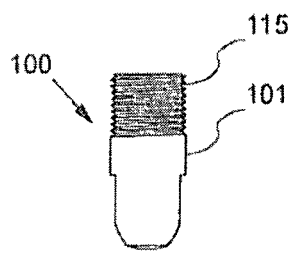
Figure 5H:
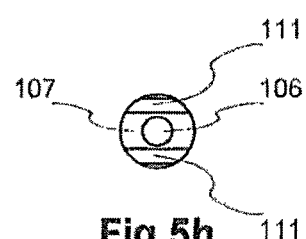
Figure 6A:
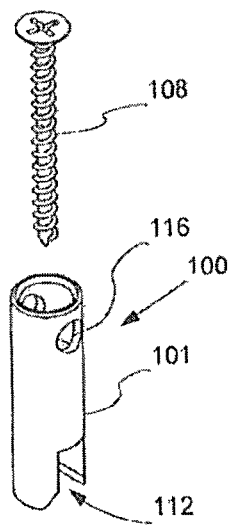
FIGS. 6a-6h are various views of the device according to a third embodiment of the invention.
Figure 6B:
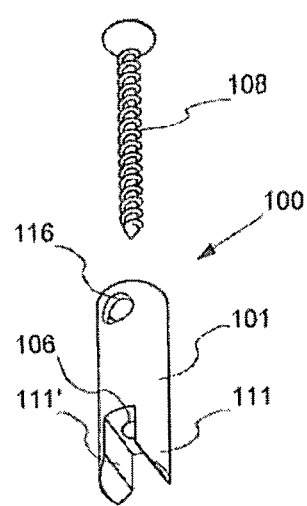
Figure 6C:
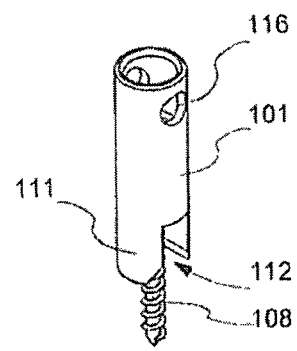
Figure 6D:
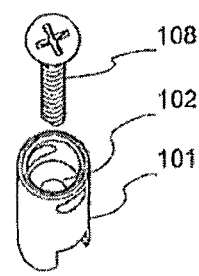
Figure 6E:
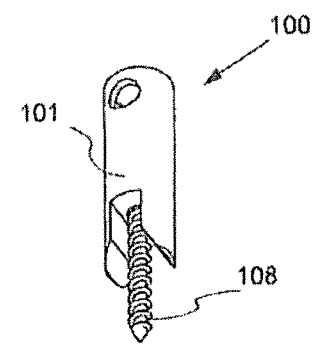
Figure 6F:
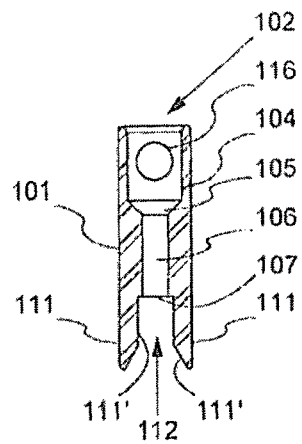
Figure 6G:
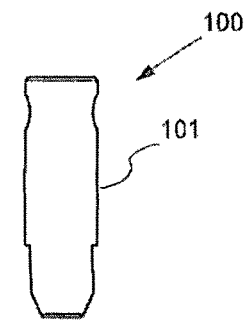
Figure 6H:
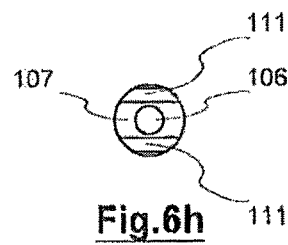

With reference to FIG. 4*f*, the through-hole 102, according to the first embodiment of the invention, preferably comprises a first threaded section 103 with a larger diameter and a second non-threaded section 104, a flared section 105 and an end section 106 with a smaller diameter.

In its bottom part, the device 100 has a mouth with two jaws 111, the purpose of which will be described below with reference to FIGS. 7 and 8. Each jaw 111 preferably comprises a flat wall 111' facing the corresponding flat wall of the opposite jaw. At the bottom end each jaw is tapered towards the inside of the cavity 112 bounded by them so as to form a receiving opening.

Preferably, the distance between the two flat facing walls 111' of the jaws is greater than the diameter of the end section 106 of the through-hole 102. In this way a stop point 107 is created for the panel edge, as will become clear below.

The through-hole 102 is designed to be engaged by a threaded member 108, such as a wood screw or the like. In particular, the flared section 105 is designed to seat the head of the threaded member 108 and the end section 106 is designed to guide the shank of the threaded member.

The mouth is instead configured and has dimensions such as to enclose the edge 14 of a panel, as described above.

The main body 101 may have a diameter of about 12 mm. The end section 106 may have a diameter of about 4.2 mm so as to receive a self-tapping screw with a diameter of about 4 mm.

Figures 7A, 7B, 7C:
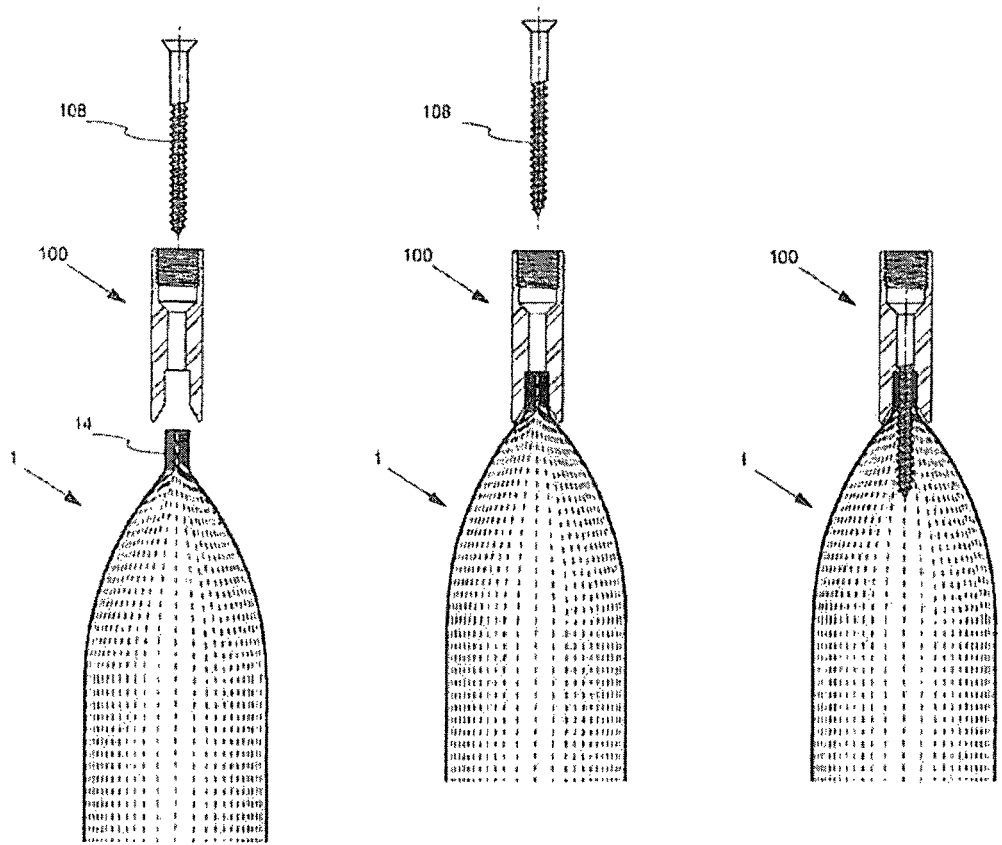
FIGS. 7a-7c illustrate in schematic form a number of steps for assembly of a device according to the invention on a sound-absorbing panel.

Fixing of the device 100 according to the first embodiment of the invention is shown in FIGS. 7*a*, 7*b* and 7*c*. FIG. 7*a* shows the device 100 according to the invention before engagement with the edge 14 of the panel 1. FIG. 7*b* shows the device 100 according to the first embodiment of the invention engaged with the edge 14 of the panel 1 before the screw 108 penetrates into the edge 14 of the panel. Finally, FIG. 7*c* shows the screw 108 fully engaged in the panel 1 and inside its edge 14.

Basically, when the screw 108 penetrates into the panel 1, the material of the panel which forms the perimetral edge 14 expands outwards against the inner walls 111' of the cavity 112. The two rigid jaws 111 are not deformed, but maintain substantially their shape and remain substantially parallel to each other. A retention effect similar to that of a screw screwed into an expansion plug is created. Essentially, the screw 108 and the two walls 111' of the cavity act in such a way that the material trapped between the screw and the walls of the jaws 111 acts as an expander in the same way as in ordinary rawl plugs. If the facing flat walls of the jaws were not present, the fibrous and thin edge 14 of the panel would split.

The screw 108 may also penetrate into the less dense part of the panel 1 and not only into its edge 14, as shown in FIG. 7*c*. This ensures a better grip and helps maintain the direction.

The device 100, advantageously, is thus fixed to the panel 1 in a firm and stable manner, maintaining substantially a predetermined direction (aligned with the edge 14 of the panel). The smaller-diameter section of the through-hole forms a guide for the screw and provides the direction for penetration into the panel.

Figure 8A:
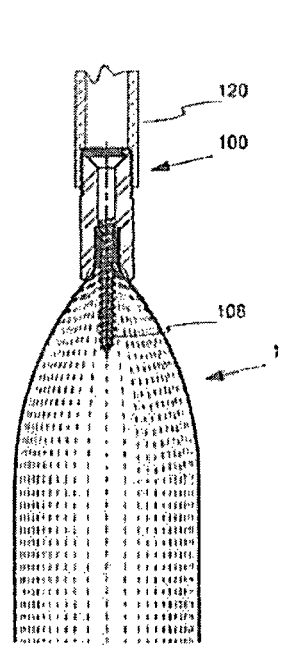
FIGS. 8a-8f shows in schematic form various ways of connecting the invention to another member.
Figure 8B:
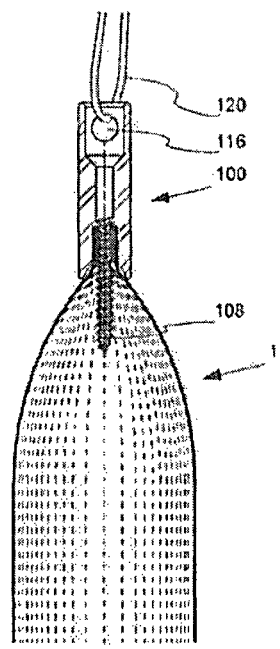
Figure 8C:
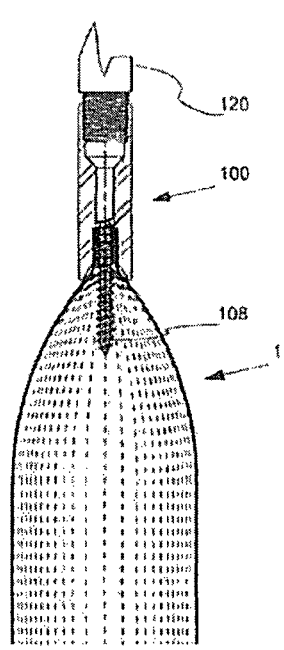
Figure 8D:
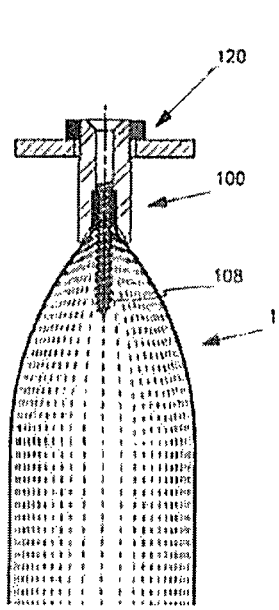
Figure 8E:
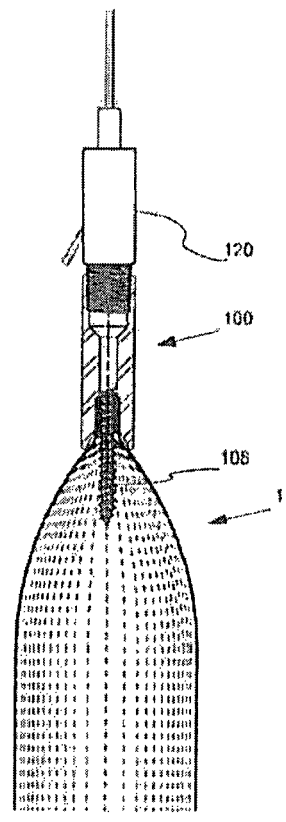

As mentioned above, the first section 103 of the through-hole 102 is threaded. This allows a further support element 120 to be associated with the device 100 according to the invention. This support element may be, for example, a bar which is (at least partly) threaded externally, a threaded cylinder-piece fixed to a bracket, an articulated joint, a cable, a wire, etc. Some alternatives are shown in FIGS. 8*c* and 8*e*. In FIG. 8*e*, the device according to the invention is fixed to a cable-locking means.

The device 100 is able to support high loads of a few tens of kilograms.

A single device 100 is able to support easily vertical panels or strips of material. Two devices according to the invention manage easily to support a sound-absorbing panel weighing a few kilograms, for example with a weight of 4-10 kg.

According to an embodiment of the invention, the device 100 is made of a metallic material, such as steel, stainless steel, brass, aluminium or aluminium alloy. Alternatively, it may be made of a plastic material, thermoplastic material (for example PA) or similar material.

Advantageously, the two jaws 111 with flat and parallel walls 111' may be made by means of milling or casting.

A further advantage of the invention is that the panel fixing points are not predetermined and therefore may be adapted to any existing (wall or ceiling) structures.

The device 100 according to the second embodiment of the invention (FIG. 5) is similar to that of the first embodiment. The difference consists in the fact that the first threaded section 103 of the through-hole 102 is not present, but an external thread 115 is formed at the top end of the main body. Therefore, advantageously, the device 100 according to the second embodiment may be shorter than the first variant.

The external thread 115 (in a similar manner to the thread 103) of the second variant allows a further support element 120 to be associated with the device 100 according to the invention. This support element may be, for example, a bar which is (at least) partly internally threaded, an internally threaded cylinder-piece which is fixed to a bracket, an articulated joint, a cable, a wire, etc. FIGS. 8*a* and 8*d* show, by way of example, two support elements 120 which are designed to engage with the device according to the second embodiment of the invention.

The third embodiment (FIG. 6) is similar to the first embodiment, but does not comprise a threaded section 103. Instead it comprises, in the top part of the main body, two small holes 116 with their axis along a diameter of the main body 101. In one embodiment, the axis of the holes 116 is parallel to the flat internal surface 111' of the jaws 111.

The holes 116 may have a circular shape and may have a diameter of about 6 mm.

The holes 116 allow the insertion of a member 120 such as a pin, a rivet, a threaded member, a cable, a hook or the link of a chain. FIG. 8b shows the solution with a cable 120 inserted inside the holes 116 so as to form a loop.

Figure 8F:
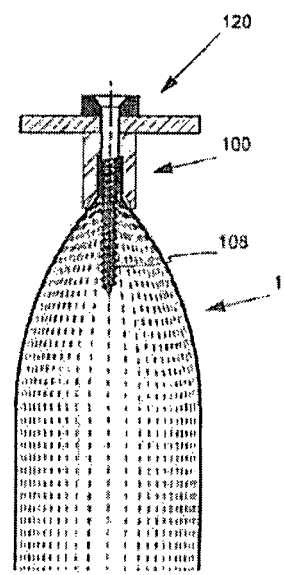

FIG. 8f shows in schematic form another variant of a member 120 designed to cooperate with a device 100 according to the invention. Differently from the other figures, the screw interacts with the outside of the support 120.

FIGS. 9a, 9b and 9c show three different further embodiments of the device 100 according to the invention. Generally, the device according to these further embodiments is configured as an elongated element suitable for engagement along a section of the edge 14 of a panel and for fastening to the edge of the panel at several points. FIG. 9 show only part of the panel 1 and the device 100. Therefore, there could be one screw, two screws or more than two screws for each device 100.

According to the embodiment of FIG. 9a, the device 100 comprises an elongated body extending in a direction perpendicular to the axis of the through-holes which receive the screws 108. In this embodiment, the device 100 has a circular or a substantially circular cross-section. The through-holes 102 for the screws 108 are preferably flared so as to seat, inset, the head of the screws 108. As in all the other embodiments, the through-holes of the screws open out inside a cavity which is fitted onto the edge 14 of the panel 1. The cavity is formed with two flat and parallel walls which form two shoulders for retaining the material of the edge which expands when the screw is screwed into the panel. The operating principle is therefore entirely similar to that of the devices described above.

The embodiment shown in FIG. 9b is substantially the same as that shown in FIG. 9a, the sole difference being the shape of the cross-section of the device (substantially square instead of substantially circular).

The embodiment shown in FIG. 9c is similar to that shown in FIG. 9b. The difference consists in the fact that the main body is in the form of a profiled part which acts a guide rail. The guide rail may advantageously be used to fasten the panel (for example to a ceiling) or associate it with a vertical upright or the like.

The embodiment shown in FIG. 9d is similar to the embodiment shown in FIG. 9c. The profile creates a substantially continuous rail suitable for engagement with other elements such as hinges or the like. The cross-section of the device could be square, oval, circular, etc.

A device according to the invention may be advantageously used to fasten, hold or support a sound-absorbing panel 1 in relation to a vertical wall or the ceiling of a room. It may also be used to connect two panels 1 together (for example two devices according to invention may be connected together so that they have a same longitudinal axis or form a predetermined angle).

The same principle may be used for many other purposes, for example as a mount for adjustable feet (for resting a panel on the ground), as a mount for hinges (for allowing a panel to rotate about an axis) or for fixing a panel on the sides or at the bottom.

Figure 10:
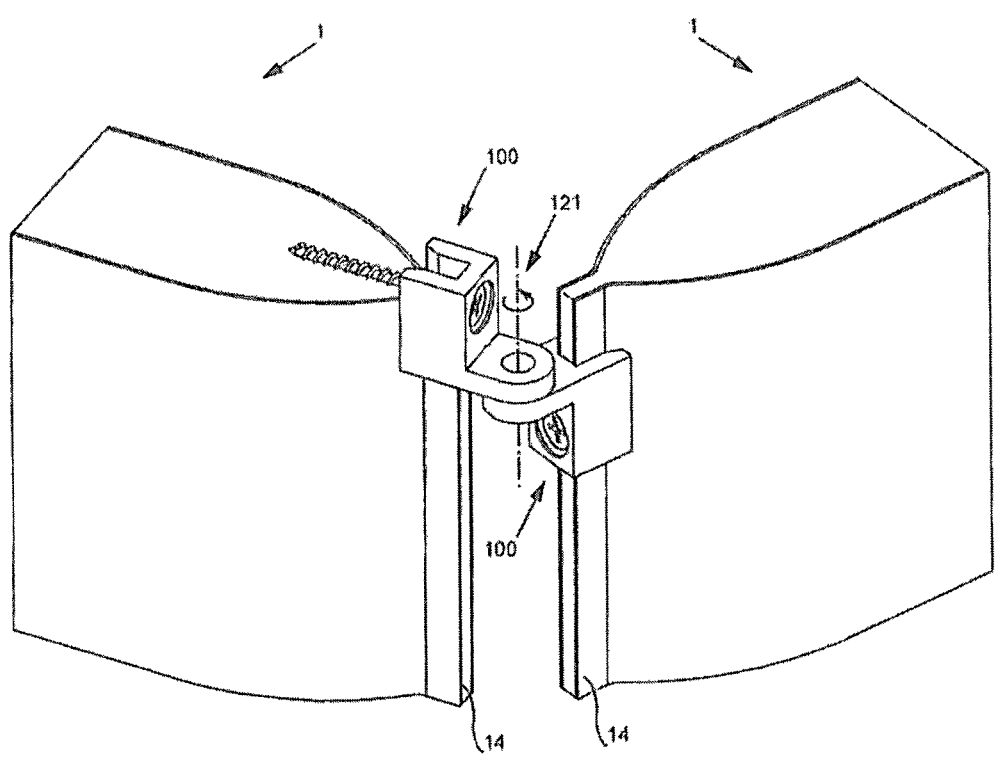
FIG. 10 shows in schematic form a device according to the invention configured to connect two panels rotatably together.

FIG. 10 shows in schematic form two panel portions with two respective devices 100 according to the invention pivotably mounted to form a hinge. Each single device 100 comprises a main body with a through-hole for the screw 108 which opens out inside a cavity with two flat and parallel surfaces which form two shoulders for retaining the material of the edge 14. Each device further comprises a projecting part which is coupled together with the projecting part of the other device by means of a rotating pin (axis 121).

The invention claimed is:

1. An assembly comprising:
a panel having an edge comprised of the same material as the panel and having a smaller thickness; and a device which can be fixed to said edge of said panel, the device comprising a main body with a through-hole, a threaded element having a head and two walls which define a cavity configured to receive and cooperate with said panel edge; wherein said through-hole communicates with said cavity; wherein said through-hole is configured to guide said threaded element towards said cavity; wherein the head of said threaded element is seated within the device and said threaded element penetrates into the edge of the panel so that the panel edge expands outwardly towards the walls of the cavity and is firmly retained by said walls; and wherein an end section of said through hole has a diameter smaller than the distance between the two walls of the cavity.

2. The assembly as claimed in claim 1, wherein said threaded element is a screw.

3. The assembly as claimed in claim 2, wherein said screw is a self-tapping screw.

4. The assembly as claimed in claim 1, wherein said through-hole comprises an upper threaded section for engagement with another corresponding member.

5. The assembly as claimed in claim 1, wherein said assembly further comprises another corresponding member, wherein said main body has a cylindrical shape and comprises a threaded external surface for engagement with said another corresponding member.

6. The assembly as claimed in claim 1, wherein said assembly further comprises another corresponding member, wherein said main body has a cylindrical shape and comprises a pair of small coaxial holes for said another corresponding member.

7. The assembly as claimed in claim 6, wherein said another corresponding member is a threaded member.

8. The assembly as claimed in claim 7, wherein said threaded member is a bar which has a threaded internal or external surface.

9. The assembly as claimed in claim 1, wherein said main body is made of a metallic material.

10. The assembly as claimed in claim 1, wherein said main body is substantially cylindrical, triangular, spherical or oval, with its axis substantially coinciding with the axis of the through-hole.

11. The assembly as claimed in claim 1, wherein said main body is substantially an elongated bar extending in a direction substantially perpendicular to the axis of the through-hole.

12. The device as claimed in claim 1, wherein said device is rotatably coupled together with another similar device so as to form a hinge.

13. The assembly as claimed in claim 1, wherein said panel is a sound-absorbing panel.

14. The assembly as claimed in claim 13, wherein the panel comprises a padding layer of heat-bonded synthetic fibres and a first and second layer of fabric facing each other on opposite sides of said padding layer.

15. The assembly as claimed in claim 1, wherein said panel, in a central position thereof, has a first thickness and said edge has a second thickness which is smaller than the first thickness.

16. The assembly as claimed in claim 15, wherein said first thickness is between 2 cm and 7 cm.

17. The assembly as claimed in claim 15, wherein said second thickness is between 5% and 30% of the first thickness.

* * * * *